United States Patent
Hartmann et al.

(10) Patent No.: US 6,795,574 B1
(45) Date of Patent: Sep. 21, 2004

(54) METHOD OF CORRECTING PHYSICALLY-CONDITIONED ERRORS IN MEASUREMENT OF MICROSCOPIC OBJECTS

(75) Inventors: Hans Hartmann, Wessling (DE); Thomas Waas, Munich (DE); Hans Eisenmann, Munich (DE); Hans-Juergen Brueck, Munich (DE)

(73) Assignee: Applied Integrated Systems & Software, Munich (DE)

( * ) Notice: Subject to any disclaimer, the term of this patent is extended or adjusted under 35 U.S.C. 154(b) by 593 days.

(21) Appl. No.: 09/613,388

(22) Filed: Jul. 11, 2000

(30) Foreign Application Priority Data

May 31, 2000 (DE) .......................................... 100 27 221

(51) Int. Cl.[7] ................................................ G06K 9/00
(52) U.S. Cl. ....................................... 382/151; 382/286
(58) Field of Search .............................. 382/151, 149, 382/144, 145, 286; 430/5, 30; 348/86, 94, 95, 135, 136

(56) References Cited

U.S. PATENT DOCUMENTS

| | | | | |
|---|---|---|---|---|
| 5,650,840 A | * | 7/1997 | Taniguchi | .................... 355/55 |
| 5,863,682 A | * | 1/1999 | Abe et al. | ..................... 430/30 |
| 6,048,647 A | * | 4/2000 | Miyazaki et al. | .............. 430/5 |
| 6,167,355 A | * | 12/2000 | Fiekowsky | .................. 702/159 |
| 6,178,360 B1 | * | 1/2001 | Pierrat et al. | ............... 700/121 |
| 6,337,162 B1 | * | 1/2002 | Irie | ............................... 430/5 |

* cited by examiner

*Primary Examiner*—Yon J. Couso
(74) *Attorney, Agent, or Firm*—Keating & Bennett, LLP.

(57) ABSTRACT

A method of correcting physically conditioned errors in the measurement of an object detects an image of the object to be measured, measures the imaged object, determines a measurement error caused by structural surroundings of the object, and corrects the measurement result in dependence on the measurement error.

13 Claims, 2 Drawing Sheets

METHOD OF CORRECTING PHYSICALLY-CONDITIONED ERRORS IN MEASUREMENT OF MICROSCOPIC OBJECTS

FIELD OF THE INVENTION

The present invention refers to a method of correcting physically conditioned errors in the measurement of an object, and especially to a method of correcting physically conditioned errors in the measurement of the width of microscopic objects whose dimensions are of the same order of magnitude as the wavelength of the illumination source.

BACKGROUND OF THE INVENTION

The further development in the field of semiconductor technology leads to ever finer chip structures and this entails increasing circuit complexity. In addition to problems in the production of such structures, problems also arise in the examination of such structures, viz. when the structures produced are imaged for checking them, e.g. by measuring the width thereof. An example for a conventional method is the measurement of structure widths making use of optical microscopes, the object to be measured being illuminated in transmitted light or incident light and the resultant intensity image being subsequently observed and measured.

These methods are disadvantageous insofar as the intensity image is composed of superpositions originating from the structure to be measured as well as from structures which are arranged in the vicinity of the structure to be measured. It follows that the intensity image of the structure to be measured and therefore the measurement result are directly influenced and corrupted by the surroundings of the object to be measured. This phenomenon is known under the name of "proximity effect". Due to the corruption of the intensity images, it is impossible to make any reliable statements with regard to the shape and the dimensions of the structures produced and therefore the reliability of the production process, when the width of the object is measured.

SUMMARY OF THE INVENTION

It is the object of the present invention to provide a method of correcting physical errors in the measurement of an object so that measurement errors originating from influences of neighbouring structures are avoided.

A method of correcting physically conditioned errors in the measurement of an object, includes (a) detecting an image of the object to be measured;

(b) measuring the object imaged in the detected image;

(c) determining a measurement error caused by structures which are arranged in the vicinity of the object to be measured; and (d) correcting the measurement of step (b) in dependence on the measurement error determined.

The present invention is based on the finding that the corruption of the intensity image and the resultant effect on the measurement result—the corruption being produced by the surroundings of an object to be measured when this object is being irradiated or illuminated—can be corrected by correcting the image of the object to be measured with due regard to the error contributions from the object surroundings. Starting from the image produced in this way, the influence of the structural surroundings or object surroundings on the measurement result is eliminated. The measurement result corrected in this way will then correspond to the actual physical dimensions of the object to be measured.

According to one aspect a correction method is provided in the case of which, starting from the image produced, an intensity image of the object to be measured and of its surroundings is detected, whereupon a correction value is determined from the global image especially for the structure to be measured, the correction value depending on structures which are arranged in the vicinity of the object to be measured. Finally, the intensity image is measured and corrected in dependence on the value determined. The result of this measurement is then always a measurement value which has undergone correction and which therefore approaches the actual magnitude of the object to be measured more closely.

According to a further aspect, the detected image or intensity image contains the object to be measured and the structural surroundings thereof, so that, when the correction value or correction values is/are being determined, the measurement errors are determined and corrected in dependence on the structural surroundings contained in the intensity image detected.

According to a further aspect, the detected image or intensity image contains the object to be measured and the relevant surroundings thereof, which have an influence on the correction value to be calculated. Furthermore, a layout description of the object to be measured and imaged, respectively, and of the structural surroundings thereof is provided, and the correction factor for the measurement result is determined only in dependence on the layout description provided.

According to a further aspect, the microscopic object imaged as an image or intensity image is measured and the actual intensity image is approximated to the ideal conditions by means of a correction function.

In addition to a light source, also other radiation sources, such as an electron beam source or an X-ray source, are suitable to be used as an irradiation source.

BRIEF DESCRIPTION OF THE DRAWINGS

In the following, preferred embodiments of the present invention are described in detail making reference to the drawings enclosed, in which.

DETAILED DESCRIPTION OF THE INVENTION

According to the present invention, a method is provided, which permits a correction of physically-conditioned errors in the measurement of an object; in the description of the preferred embodiments following hereinbelow, the method for optical microscopy is described as an exemplary method; to a person skilled in the art it will, however, be obvious that the method according to the present invention can be used for all image-forming measurement methods.

Quite generally speaking, an image of the object to be measured is produced according to the present invention, the imaged object is measured, and the measurement result is corrected with due regard to the object surroundings so that the corrected measurement result then corresponds to the actual physical dimensions of the object to be measured and can be used reliably in the case of further processing.

Figure 1:
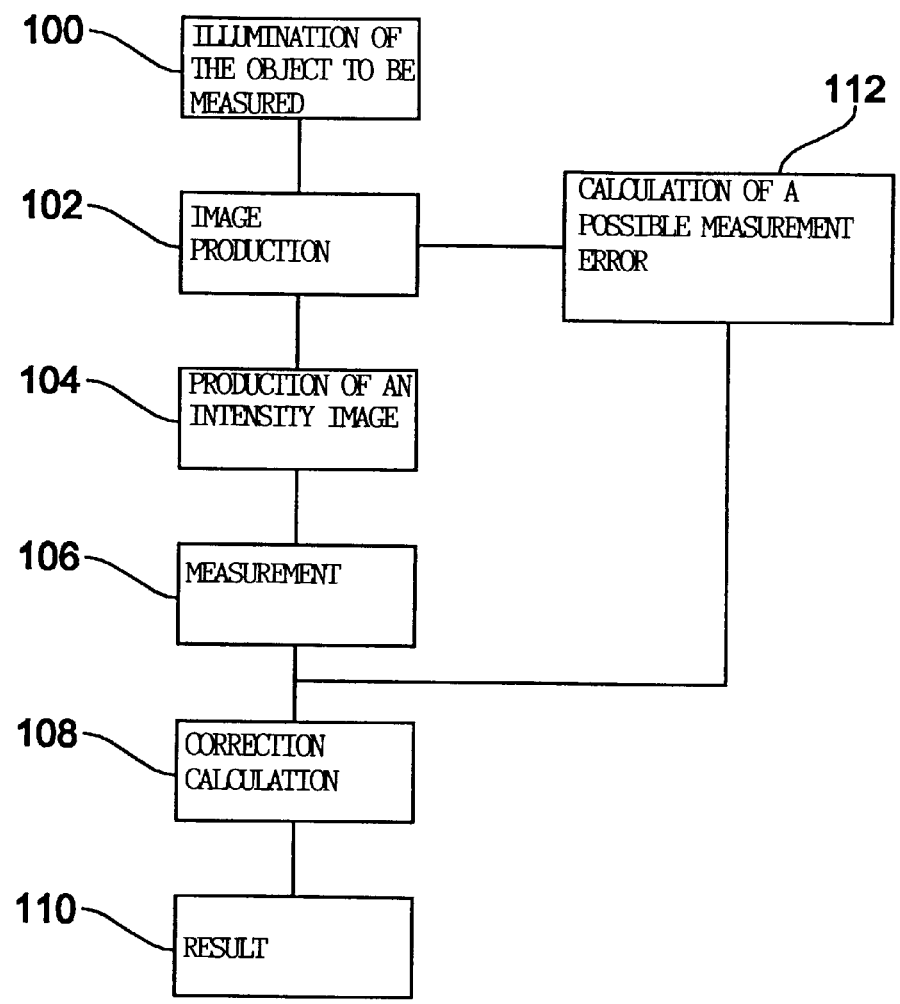
FIG. 1 shows a flow chart representing a first embodiment of the method according to the present invention.

FIG. 1 shows a first flow chart representing a first embodiment of the method according to the present invention. In a first step 100, the object to be measured is illuminated by means of light, and in step 102 an image of the object to be measured is produced. Following this, an intensity image is produced in step 104 from the image produed in step 102, and the imaged object is measured in step 106. Subsequently, correction calculation in dependence on a measurement error determined takes place in step 108 and the corrected measurement result is outputted in step 110. According to the embodiment shown in FIG. 1, the possible measurement error is determined in step 112 in that the measurement error or the possible measurement error caused by the structural surroundings of the object is calculated in dependence on the image produced in step 102 and is then supplied for correction calculation in step 108.

In the case of optical microscopy, the transfer/transmission characteristics of the measurement microscope are calculated on the basis of the characteristic data of the microscope, viz. the wavelength and the spectrum of the illumination source, the type of illumination (incident light or transmitted light), the magnification factor, the objective values (numerical aperture and sigma).

Taking these calculated transfer characteristics as a basis, the result of the measurement carried out in step 106 is corrected in step 108 in such a way that the effects of the optical "proximity effect" on the measurement result are eliminated so that the measurement value determined corresponds to the actual physical dimensions.

With regard to the present invention, reference is made to the fact that this invention is used especially for objects to be measured having dimensions in the case of which the imaging processes used and the structural density cause the above-mentioned measurement errors, e.g. line broadening and the like. These objects have dimensions in the microscopic range, which are of the same order of magnitude as the wavelength of the illumination source, e.g. 0.5 æm to 10 æm.

Figure 2:
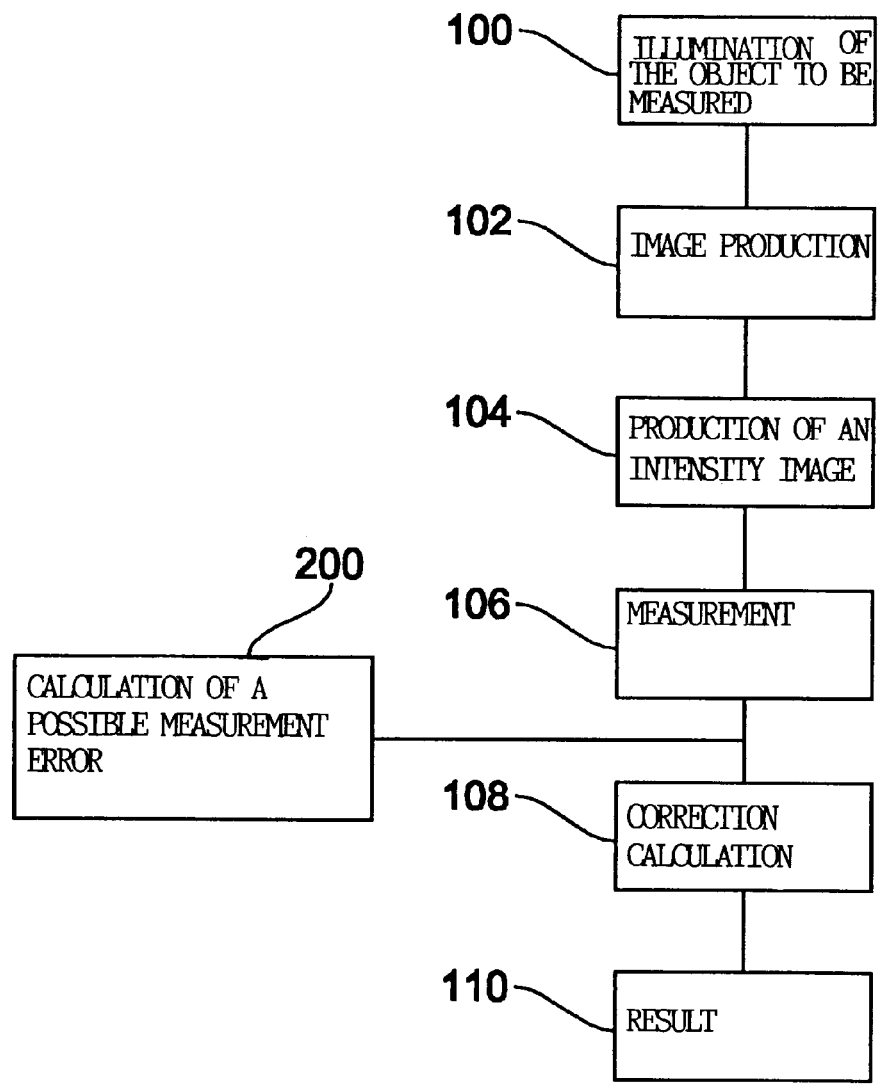
FIG. 2 shows a flow chart representing a second embodiment of the method according to the present invention.

Making reference to FIG. 2, a second embodiment of the method according to the present invention is described, the blocks and steps, respectively, which have already been described on the basis of FIG. 1 being designated by the same reference numerals. The present embodiment differs from the embodiment described in FIG. 1 insofar as the calculation of possible measurement errors is carried out independently of the image produced in step 102. According to the present embodiment, the data required for determining the measurement error are received in step 200 from an external source independently of the actually produced image. These external data include e.g. the original structure, for example in the form of a layout description, which represents the expected value of the object to be measured including its structural surroundings. On the basis of these data, the possible measurement error is calculated and the correction which has already been described making reference to FIG. 1 is carried out.

In the embodiment shown in FIG. 2, the image can, according to one implementation, be produced in step 102 in such a way that only the object to be imaged is detected, without detecting the structure surrounding this object. The correction of the measurement errors caused by the surroundings is effected in the manner described hereinbefore on the basis of a calculation of a possible measurement error in step 200.

In the case of both methods, correction can take place in step 108 in dependence on a specific correction function which approximates to the ideal conditions.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method of correcting physically conditioned errors in the measurement of an object, comprising the following steps:

(a) generating an intensity image of the object to be measured;

(b) measuring the object imaged in the generated intensity image;

(c) determining a measurement error due to the proximity effect caused by structures which are arranged in the vicinity of the object to be measured; and (d) correcting the measurement of step (b) in dependence on the measurement error determined.

2. A method according to claim 1, wherein the intensity image contains the object and the structural surroundings thereof, the measurement error being determined in step (c) in dependence on the structural surroundings contained in the intensity image.

3. A method according to claim 1, wherein the intensity image only contains the object to be imaged and wherein a layout description of the object and of its structural surroundings is additionally provided, the measurement error being determined in step (c) in dependence on the layout description provided.

4. A method according to claim 1, wherein the intensity image contains the object and the structural surroundings thereof, and wherein a layout description of the object and of its structural surroundings is additionally provided, the measurement error being determined in step (c) in dependence on the layout description provided.

5. A method according to claim 1, wherein the irradiation source is a light source or an electron beam source.

6. A method according to claim 1, wherein the corrected measurement result is outputted.

7. A method according to claim 2, wherein the irradiation source is a light source or an electron beam source.

8. A method according to claim 3, wherein the irradiation source is a light source or an electron beam source.

9. A method according to claim 4, wherein the irradiation source is a light source or an electron beam source.

10. A method according to claim 2, wherein the corrected measurement is outputted.

11. A method according to claim 3, wherein the corrected measurement is outputted.

12. A method according to claim 4, wherein the corrected measurement is outputted.

13. A method according to claim 5, wherein the corrected measurement is outputted.

* * * * *

UNITED STATES PATENT AND TRADEMARK OFFICE
CERTIFICATE OF CORRECTION

PATENT NO. : 6,795,574 B1
DATED : September 21, 2004
INVENTOR(S) : Hans Hartmann et al.

It is certified that error appears in the above-identified patent and that said Letters Patent is hereby corrected as shown below:

<u>Title page,</u>
Item [73], should read:
-- [73]   Assignee:   PDF Solutions GmbH, Munich (DE)
                     MueTec, Munich (DE) --

Signed and Sealed this

Fifteenth Day of February, 2005

JON W. DUDAS
*Director of the United States Patent and Trademark Office*